US012568464B2

(12) United States Patent
Lee et al.

(10) Patent No.: US 12,568,464 B2
(45) Date of Patent: Mar. 3, 2026

(54) INDOOR WIRELESS POSITIONING METHOD BASED ON VARIABILITY FEATURE, SYSTEM AND DEVICE THEREFOR

(71) Applicants: SKAIChips Co., Ltd., Suwon-si (KR); Research & Business Foundation SUNGKYUNKWAN UNIVERSITY, Suwon-si (KR)

(72) Inventors: Kang Yoon Lee, Seoul (KR); Dong Gyun Kim, Suwonsi (KR); Ju Won Oh, Suwon-si (KR); Jong Wan Jo, Suwon-si (KR)

(73) Assignees: SKAIChips Co., Ltd., Suwon-si (KR); Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 259 days.

(21) Appl. No.: 18/223,955

(22) Filed: Jul. 19, 2023

(65) Prior Publication Data

US 2024/0129890 A1    Apr. 18, 2024

(30) Foreign Application Priority Data

Oct. 14, 2022    (KR) ......................... 10-2022-0132707

(51) Int. Cl.
*H04W 64/00* (2009.01)
*H04B 17/27* (2015.01)
(52) U.S. Cl.
CPC .......... *H04W 64/006* (2013.01); *H04B 17/27* (2015.01)
(58) Field of Classification Search
CPC ..... H04W 64/006; H04W 4/021; H04W 4/33; H04W 64/00; H04W 4/02; H04B 17/27;
(Continued)

(56) References Cited

U.S. PATENT DOCUMENTS 7,433,693 B2 * 10/2008 Sheynblat ........... G01S 5/02523
342/357.29
10,070,261 B2    9/2018 Dal Santo et al.
(Continued)

FOREIGN PATENT DOCUMENTS

KR    10-2009-0059920 A    6/2009
KR    10-2017-0078116 A    7/2017

OTHER PUBLICATIONS

European Search dated Apr. 9, 2024 from European Patent Office for Application No. 23185206.2.
(Continued)

*Primary Examiner* — Don N Vo
(74) *Attorney, Agent, or Firm* — Insight Law Group, PLLC; Seung Lee

(57) ABSTRACT

An indoor wireless positioning method includes receiving initial received signal strength indicator (RSSI) information from a reception unit; searching for a fingerprint matching measured initial RSSI information in a fingerprint database; determining a first location corresponding to the retrieved fingerprint to be an initial location of the reception unit; receiving additional RSSI information from the reception unit; extracting features of variability between the additional RSSI information and the initial RSSI information; searching for variability fingerprints matching the initial location and extracted RSSI variability features in a variability fingerprint database; and updating a second location to a current location of the reception unit when the second location corresponding to the retrieved variability fingerprint is different from the initial location, wherein the second location is a location in a candidate area within a preset distance range centered on the first location.

11 Claims, 5 Drawing Sheets

(58) Field of Classification Search
CPC ............... G01S 5/02521; G01S 5/0278; G01S
5/02524; G01S 5/0252; G01S 11/06;
G01S 2205/02; G06N 20/00
USPC ...................................................... 455/456.1
See application file for complete search history.

(56) References Cited

U.S. PATENT DOCUMENTS

| | | | |
|---|---|---|---|
| 10,356,741 B2 * | 7/2019 | Wigren ................. | H04W 24/10 |
| 2010/0265093 A1 | 10/2010 | Cho et al. | |
| 2012/0056785 A1 | 3/2012 | Jovicic et al. | |
| 2014/0171100 A1 * | 6/2014 | Marti .................. | G01S 5/02524 |
| | | | 455/456.1 |
| 2015/0005000 A1 | 1/2015 | Gyorfi et al. | |
| 2015/0271641 A1 * | 9/2015 | Sung ......................... | G01S 5/02 |
| | | | 455/456.6 |
| 2016/0094951 A1 * | 3/2016 | Yang ..................... | H04W 4/029 |
| | | | 455/456.1 |
| 2020/0037112 A1 * | 1/2020 | Tyagi ..................... | H04B 17/27 |

OTHER PUBLICATIONS

Office Action dated Apr. 24, 2024 from European Patent Office for Application No. 23185206.2.
Office Action mailed on Dec. 18, 2024 from Korean Patent Office for Application No. 10-2022-0132707.
Notice of Allowance mailed on Mar. 5, 2025 from Korean Patent Office for Application No. 10-2022-0132707.

* cited by examiner

100

<u>110</u>

| Coordinate | | RSSI Info | | | |
|---|---|---|---|---|---|
| x | y | 1st AP | 2nd AP | ... | N^th AP |
| x1 | y1 | RSSI11 | RSSI21 | ... | RSSIN1 |
| x2 | y2 | ... | ... | ... | ... |
| ... | ... | ... | ... | ... | ... |
| xN | yN | RSSI1N | RSSI2N | ... | RSSINN |

FIG.5

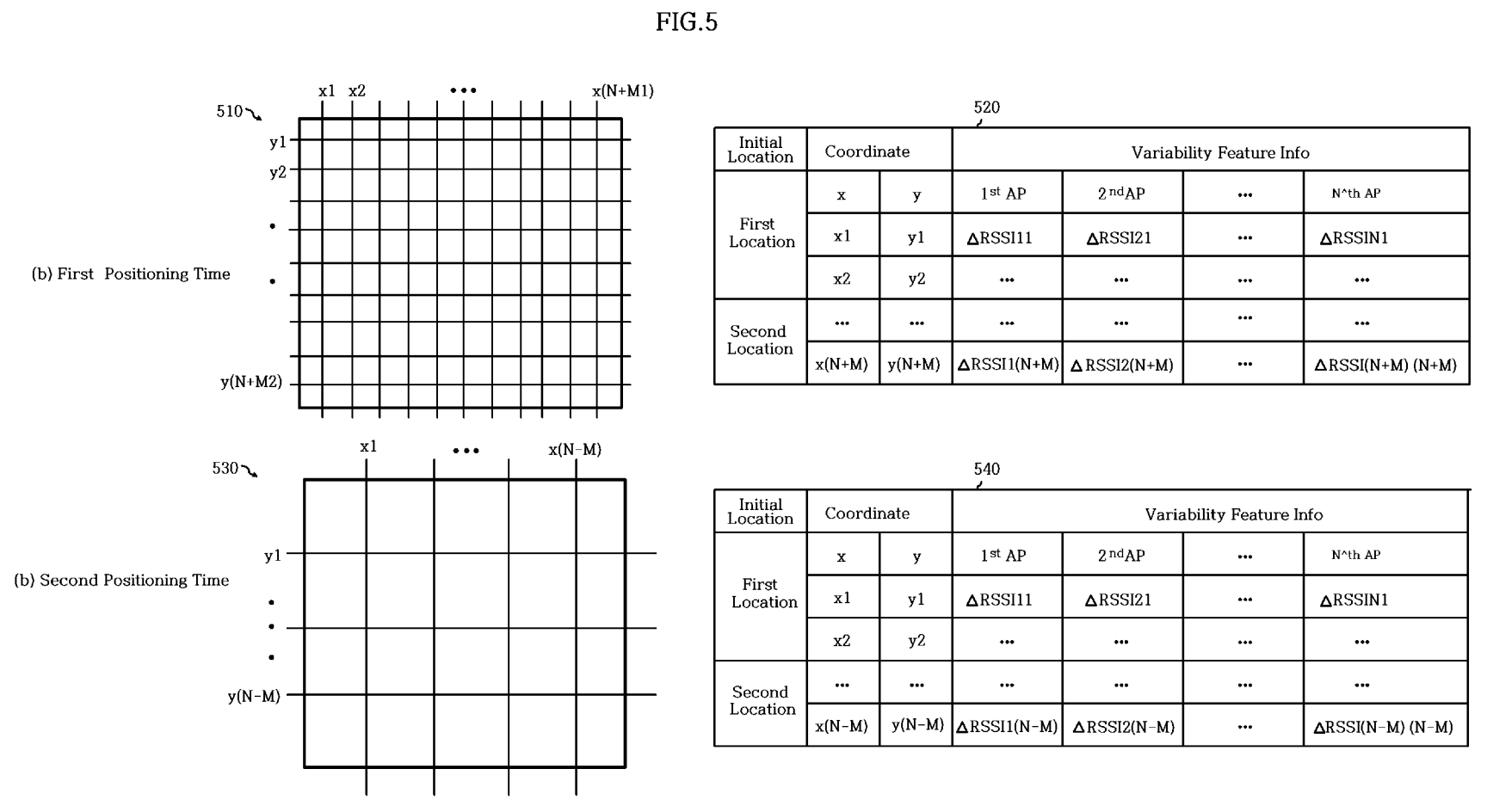

510 (b) First Positioning Time

520

| Initial Location | Coordinate | | Variability Feature Info | | | |
|---|---|---|---|---|---|---|
| | x | y | 1st AP | 2nd AP | ... | N^th AP |
| First Location | x1 | y1 | ΔRSSI11 | ΔRSSI21 | ... | ΔRSSIN1 |
| | x2 | y2 | ... | ... | ... | ... |
| | ... | ... | ... | ... | ... | ... |
| Second Location | x(N+M) | y(N+M) | ΔRSSI1(N+M) | ΔRSSI2(N+M) | ... | ΔRSSI(N+M) (N+M) |

530 (b) Second Positioning Time

540

| Initial Location | Coordinate | | Variability Feature Info | | | |
|---|---|---|---|---|---|---|
| | x | y | 1st AP | 2nd AP | ... | N^th AP |
| First Location | x1 | y1 | ΔRSSI11 | ΔRSSI21 | ... | ΔRSSIN1 |
| | x2 | y2 | ... | ... | ... | ... |
| | ... | ... | ... | ... | ... | ... |
| Second Location | x(N-M) | y(N-M) | ΔRSSI1(N-M) | ΔRSSI2(N-M) | ... | ΔRSSI(N-M) (N-M) |

INDOOR WIRELESS POSITIONING METHOD BASED ON VARIABILITY FEATURE, SYSTEM AND DEVICE THEREFOR

CROSS-REFERENCE TO RELATED APPLICATIONS

This application claims priority to and benefit of Korean Patent Application No. 10-2022-0132707, filed Oct. 14, 2022, in the Korean Intellectual Property Office, the disclosures of which are incorporated herein in their entirety by reference.

FIELD OF THE INVENTION

In the present specification, proposed are an indoor wireless positioning method based on a variability feature, and a system and device therefor.

BACKGROUND

A location-based service (LBS) checks current location information with a satellite-based location confirmation & reception terminal such as a global positioning system (GPS) terminal and uses the confirmed information to provide various additional services such as route guidance, surrounding information guidance, traffic information, logistics control, rescue requests, crime report responses, and location-based customer relationship management (CRM).

In order to use such an LBS, it is essential to determine the location of a location confirmation & reception terminal. However, satellite-based location confirmation & reception terminals have a problem in that they are unable to provide location information in areas where satellite signals are weak, such as indoors, tunnels, underground parking lots, or downtown areas.

To solve such a problem, various indoor positioning technologies are being studied to provide an LBS in areas where satellite signals are weak, such as indoors. In particular, many studies and developments have been conducted on wireless positioning methods using wireless communication devices such as wireless local area network (WLAN), ultra-wideband wireless communication (UWB), a spread spectrum (CSS), ZigBee, and Bluetooth.

Indoor positioning based on wireless communication infrastructure has problems in that a distance between an access point (hereinafter referred to as AP) and a reception terminal is short, and it is difficult to calculate positioning information with high accuracy due to the influence of multi-path error or signal attenuation caused by walls or furniture and the like.

In addition, in the case of time synchronization between multiple APs or time synchronization between an AP and a reception terminal failure, positioning techniques such as time difference of arrival (TDoA) using a relative difference in arrival times of radio waves from two APs, or time of arrival (ToA) performing positioning based on the arrival time of a radio wave between an AP and a reception terminal, cannot be used. Accordingly, a positioning technique using received signal strength indicator (RSSI) information of signals received at a reception terminal should be used.

As a method of estimating the location of a reception terminal using RSSI information, trilateration or fingerprint technique is used.

Trilateration is a method of estimating a position by estimating a distance between an AP and a reception terminal using a propagation attenuation model of signals, and a fingerprint technique is a method of storing signal strength values, which are measured in advance and transmitted from each AP, in a database and calling location information corresponding to a signal strength value when receiving signal strength values from a reception terminal so as to provide the location information to the reception terminal.

SUMMARY OF INVENTION

Problem to be Solved

Although the accuracy of a fingerprint technique is relatively high, it is highly variable as it is greatly affected by floating population, structural features of indoor spaces, and positioning time, so there is still a need to further improve its accuracy.

Means to Solve the Problem

An indoor wireless positioning method according to one embodiment of the present invention includes: receiving initial received signal strength indicator (RSSI) information from a reception unit; searching for a fingerprint matching measured initial RSSI information in a fingerprint database; determining a first location corresponding to the retrieved fingerprint to be an initial location of the reception unit; receiving additional RSSI information from the reception unit; extracting features of variability between the additional RSSI information and the initial RSSI information; searching for variability fingerprints matching the initial location and extracted RSSI variability features in a variability fingerprint database; and updating a second location to a current location of the reception unit when the second location corresponding to the retrieved variability fingerprint is different from the initial location, wherein the second location is a location in a candidate area within a preset distance range centered on the first location.

Effects of the Invention

According to an embodiment of the present invention, the present invention provides an effect of providing an indoor positioning method with more improved accuracy by determining a location based on an initial location and RSSI variability features.

BRIEF DESCRIPTION OF THE DRAWINGS

FIG. 5 is an exemplary diagram illustrating variability fingerprint profiles for each positioning time according to an embodiment of the present invention.

DETAILED DESCRIPTION

Since the technology described below may have various modifications and various embodiments, specific embodiments will be illustrated in the accompanying drawings and described in detail. However, this is not intended to limit the technology described below to specific embodiments, and it should be understood to include all modifications, equivalents, or substitutes included in the spirit and scope of the technology described below.

The terms "first," "second," "A," and "B" may be used to describe various components, but the components should not be limited by the terms. The terms are used only for the purpose of distinguishing one component from another. For example, without departing from the scope of the technology described below, the first component may be referred to as the second component, and similarly, the second component may also be referred to as the first component. The term and/or includes a combination of a plurality of related items or any item of a plurality of related items. For example, "A and/or B" may be interpreted as meaning "at least one of A or B." Also, "/" can be interpreted as "and" or "or."

As used herein, the singular forms "a" and "an" are intended to include the plural forms as well, unless the context clearly indicates otherwise. It is to be understood that the term "includes" used herein means that the presence of a part or a combination thereof, and does not exclude the possibility of the presence or addition of one or more other features or numbers, step operation components, parts or combinations thereof.

In addition, it is to be clarified that the classification of the components in the present specification is merely a classification for each main function that each component is responsible for. That is, two or more components to be described below may be combined into one component, or one component may be provided divided into two or more for each function. Each of the components to be described below may additionally perform some or all of the functions of other components in addition to its own main function, and of course, some of the main functions of each of the components may be exclusively carried out by other components.

In addition, in performing a method or an operation method, each step constituting the method may occur in a different order from the specified order unless a specific order is clearly described in context. That is, each step may occur in the same order as specified, may be performed substantially simultaneously, or may be performed in the reverse order.

Figure 1:
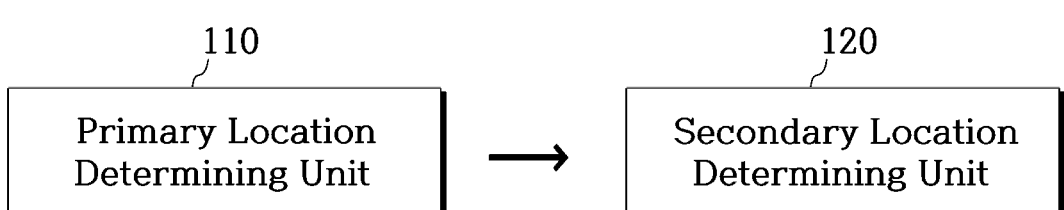
FIG. 1 is a conceptual diagram of an indoor wireless positioning system according to one embodiment of the present invention.
Figure 2:
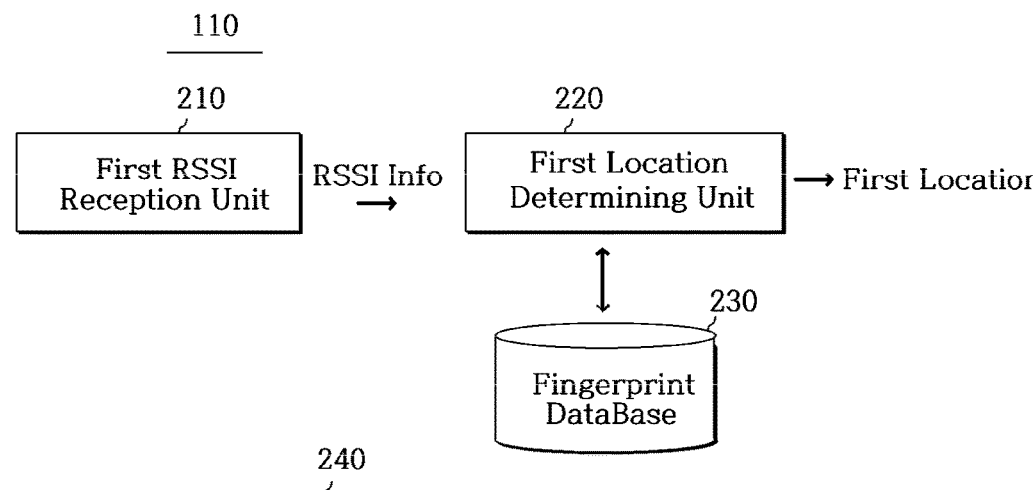
FIG. 2 is a block diagram of a primary location determining unit according to one embodiment of the present invention.
Figure 3:
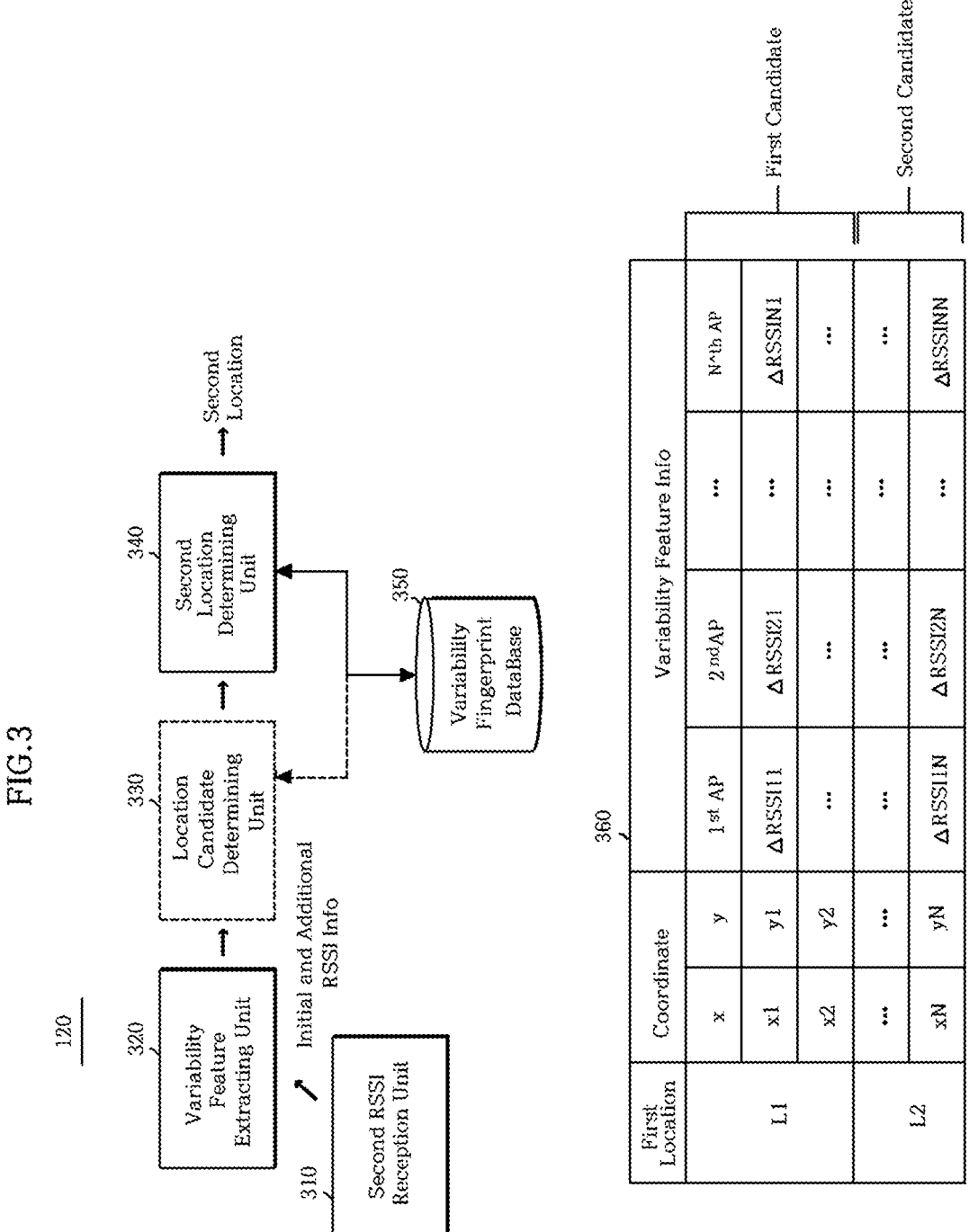
FIG. 3 is a block diagram of a secondary location determining unit according to an embodiment of the present invention.

FIG. 1 is a conceptual diagram of an indoor wireless positioning system according to one embodiment of the present invention, FIG. 2 is a block diagram of a primary location determining unit according to one embodiment of the present invention, and FIG. 3 is a block diagram of a secondary location determining unit according to an embodiment of the present invention.

Referring to FIG. 1, an indoor wireless positioning system 100 may include a primary location determining unit 110 and a secondary location determining unit 120.

The primary location determining unit 110 may determine an initial location by searching for a fingerprint in a pre-constructed fingerprint database based on received signal strength indicator (RSSI) information transmitted from a reception unit. However, since RSSI has high variability depending on structural features of indoor spaces, positioning time, floating population, etc., it is difficult to accurately determine the position of the reception unit only by positioning with the primary location determining unit 110. Therefore, the indoor wireless positioning system 100 proposed in this specification introduces a secondary location determining unit 120 that performs an additional positioning operation based on the variability of RSSI.

The secondary location determining unit 120 may determine a final position by extracting variability features between initial RSSI information and additional RSSI information based on the additional RSSI information transmitted from the reception unit, and searching for a variability feature fingerprint matching the variability feature in the pre-constructed variability fingerprint database. Therefore, it may be regarded that the secondary location determining unit 120 performs a function of finely adjusting or updating a primary location (or initial location) determined by the primary location determining unit 110 periodically/in real time.

Detailed operations of each of the primary location determining units 110 and 120 will be described below with reference to FIGS. 2 and 3.

Referring to FIGS. 1 and 2, the primary location determining unit 110 may include a first RSSI reception unit 210, a first location determining unit 220, and a fingerprint database 230.

The first RSSI reception unit 210 may receive initial RSSI information (RSSI from each AP measured by the reception unit) from the reception unit, which is a positioning target, and transmit the initial RSSI information to the first location determining unit 220. As the wireless signals, various wireless communication signals such as Bluetooth and WiFi signals may be applied.

The first location determining unit 220 may search the fingerprint database 230 for a fingerprint matching the initial RSSI information received from the first RSSI reception unit 210. In the fingerprint database 230, RSSIs for each pair of coordinates (x, y) corresponding to the location of the indoor space may be stored in the form of a fingerprint (i.e., RSSI pattern/characteristic/sequence for each AP). In the drawing, a case in which fingerprint data is stored in the fingerprint database 230 in the form of a look-up table 240 for each pair of coordinates is exemplified, but the present invention is not limited thereto. In addition, in the present specification, for convenience of explanation, two-dimensional x and y coordinates are illustrated, but the present invention is not limited thereto, and it can be extended three-dimensionally with x, y, and z coordinates.

It is assumed that the fingerprint database 230 is constructed in advance before indoor positioning, and may be built in various ways. As one embodiment, the primary location determining unit 110 may virtually form a plurality of vertical and horizontal grid lines (x, y) on an indoor (planar) space, which is a priority positioning target. In the case of 3D positioning, height grid lines can be additionally virtually formed. Next, the primary location determining unit 110 may obtain RSSIs, which are transmitted from a plurality of APs disposed at different locations in the indoor space, for each of the intersections of the vertical and horizontal grid lines. At this time, the primary location determining unit 110 may directly measure the RSSI received from each AP by directly locating test reception units at each intersection, or obtain the RSSI for each intersection by predicting the RSSI for each intersection based on the features of the indoor space, obstacles, walls, signal attenuation features, path loss index, and the like. Finally, the first location determining unit 220 links location (or coordinate) information of each intersection with the RSSIs obtained for each intersection to create a look-up table 240 as illustrated in the drawing, thereby constructing a fingerprint database 230. However, the present invention is not limited thereto, and in various embodiments, the fingerprint database 230 may be pre-constructed.

The first location determining unit 220 may determine the primary location (or coordinates) corresponding to the retrieved fingerprint as the initial location (or primary location) of the reception unit. For example, when exemplified based on this drawing, the first location determining unit 220 may determine the initial location of the reception unit as x1 and y1 when receiving initial RSSI information in the form of a fingerprint such as RSSI11, RSSI21, or RSSIN1.

The initial location determined in this way may be finely adjusted and updated by the secondary location determining unit 120 to be described below.

Referring to FIGS. 1 and 3, the secondary location determining unit 120 may include a second RSSI reception unit 310, a variability feature extracting unit 320, a location candidate determining unit 330, a second location determining unit 340, and a variability fingerprint database 350.

After the initial location is determined, the second RSSI reception unit 310 may receive additional RSSI information (RSSI from each AP additionally measured by the reception unit) from the reception unit and transmit the additional RSSI information to the variability feature extracting unit 320.

The variability feature extracting unit 320 may extract RSSI variability features with a variability feature classification model previously built through machine learning. The variability feature may be extracted based on at least one category among the maximum variation value, the minimum variation value, a variation range, and a variation speed of the RSSI information collected for each intersection, and the variability feature classification model may be pre-constructed by machine learning of the RSSI variability features for each AP based on these categories. This variability feature classification model may be built when the fingerprint database and the variability fingerprint database 350 are pre-constructed. The variability feature extracting unit 320 may extract and classify variability features between the initial RSSI information and the additional RSSI information after inputting the initial RSSI information and the additional RSSI information into the variability feature classification model.

The location candidate determining unit 330 may perform a function of selecting candidate locations/coordinates based on the initial location. Since a second location is highly likely to be located within a candidate area at a preset distance range centered on the initially determined first location, using this characteristic, the location candidate determining unit 330 may perform a role of primarily selecting candidate locations/coordinates so that a second location determining unit 340 does not have to compare each variability fingerprint with all variability fingerprints included in the variability fingerprint database 350. Due to this, an effect of significantly reducing the operation overhead of the second location determining unit 340 is obtained. Therefore, the location candidate determining unit 330 may be selectively included in the secondary location determining unit 120 depending on embodiments.

The second location determining unit 340 may search the variability fingerprint database 350 for a variability fingerprint matching the first location and/or the RSSI variability features. More specifically, the second location determining unit may select candidate variability features (or candidate variability fingerprints) corresponding to the intersections included in a preset distance range from the first location (or initial location), and search for a variability feature (or variability fingerprint) that matches the RSSI variability feature received from the variability feature extracting unit 320 among them. The second location determining unit 340 may determine a location/coordinates corresponding to the retrieved variability fingerprint as the second location/coordinates (or final position/coordinates). When the second location corresponding to the retrieved variability fingerprint is different from the first location (or initial location), the second location determining unit 340 may update the second location to the current location of the reception unit. Conversely, when the second location corresponding to the retrieved variability fingerprint and the first location (or initial location) are the same, the second location determining unit 340 may maintain the initial location as the current location of the reception unit and replace/recognize the additional RSSI information with/as the initial RSSI information.

The variability fingerprint database 350 may also be pre-constructed in various ways similar to the above-described fingerprint database. As an embodiment, the secondary location determining unit 120 may first collect RSSIs transmitted from a plurality of APs for a predetermined period for each intersection. Next, the secondary location determining unit 120 may extract variability features of the collected RSSIs for each intersection using a machine learning-based feature extraction algorithm. Finally, the secondary location determining unit 120 may pre-construct the variability fingerprint database 350 by linking the location information of each intersection with the variability features extracted for each intersection. Since both a variability feature classification model and the variability fingerprint database 350 may be built using the machine learning-based feature extraction algorithm, they can be built together at the same time. The above description of the construction of the variability feature classification model may be equally/similarly applied to the construction of the variability fingerprint database 350. Accordingly, redundant descriptions are omitted. The variability fingerprint database 350 may also be implemented in the form of a look-up table 360 for each pair of coordinates, but is not limited thereto.

Figure 4:
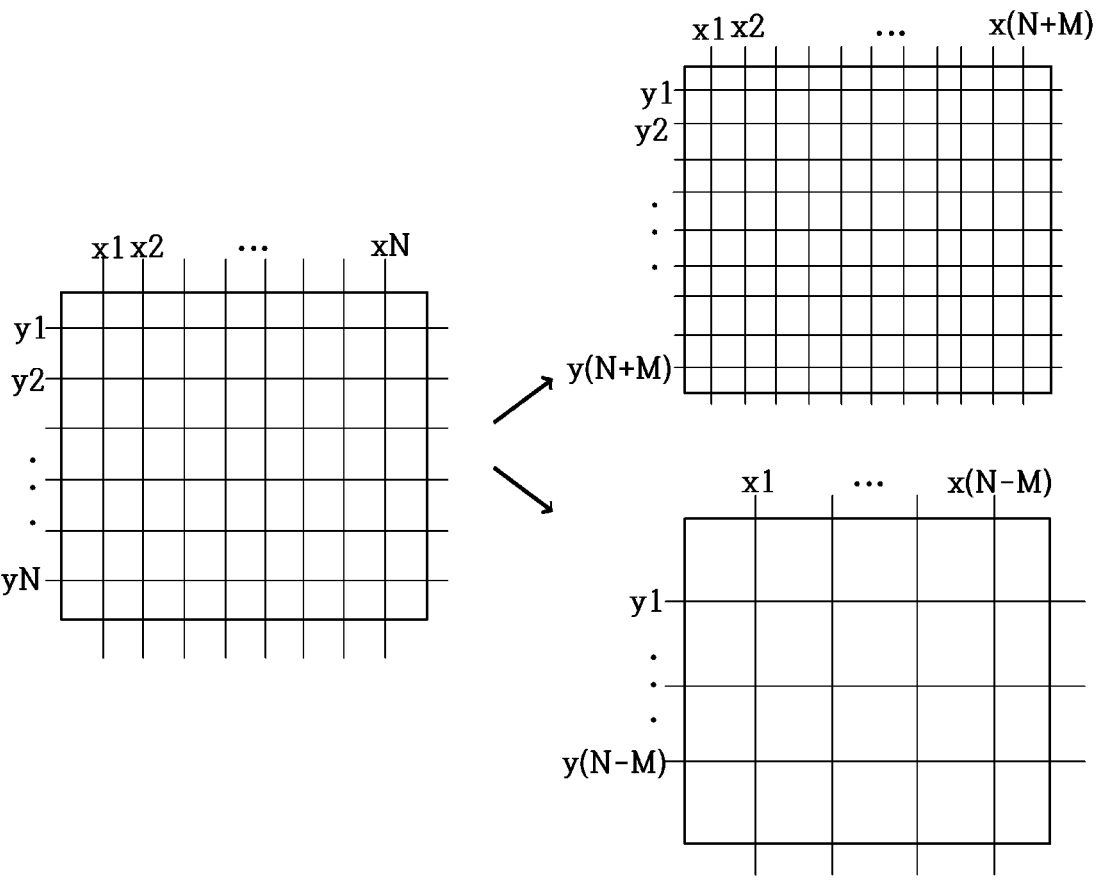
FIG. 4 is a diagram illustrating an indoor space on which vertical and horizontal grid lines are virtually formed according to an embodiment of the present invention.

FIG. 4 is a diagram illustrating an indoor space on which vertical and horizontal grid lines are virtually formed according to an embodiment of the present invention.

Indoor wireless positioning may be performed based on vertical/horizontal grid lines that virtually partition an indoor space. Accordingly, the accuracy of indoor positioning may vary depending on intervals at which the space is divided. For example, as illustrated in the drawing, even in the same indoor space, the more grid lines and the smaller the spacing, the slower the positioning speed, but the better the accuracy of the indoor positioning. In addition, the smaller the number of grid lines and the wider the spacing, the faster the positioning speed, but the lower the accuracy of the indoor positioning. Thus, in the case of simply improving the accuracy of the indoor positioning as a priority, the speed of the entire system is reduced, and in the case of considering only the speed of the entire system as a priority, the accuracy of the indoor positioning is reduced.

Therefore, based on the above-described problems, the present specification presents a method for optimizing the speed and accuracy of indoor positioning by dynamically adjusting the virtual partitions of an indoor space based on at least one among floating population and structural features (e.g., presence/position of walls, obstacles, traffic, paths, etc.) of indoor spaces, and positioning time.

When the indoor space is a space where RSSI variability is expected to be high, such as a public place with a large floating population, because it is predicted that the positioning accuracy will be greatly reduced due to the large variability, it may be more important to improve the accuracy even if the positioning speed is slightly reduced. On the other hand, when the indoor space is a space where RSSI variability is expected to be low, such as a non-public place with a small floating population, securing positioning speed may be more important because the positioning accuracy is secured above a certain level due to the small variability.

In view of this point, as an embodiment, as an average floating population of an indoor space increases, the number of virtually formed vertical and horizontal grid lines increases and the spacing therebetween becomes narrower, and as an average floating population decreases, the number of the virtually formed vertical and horizontal grid lines decreases and the spacing therebetween becomes wider. As another embodiment, based on structural features, as the variability of an indoor space is predicted to be higher (for example, in the case in which there are walls, obstacles, traffic, etc. in the signal transmission path), the number of virtually formed vertical and horizontal grid lines increases and the spacing therebetween becomes narrower, and as the variability of an indoor space is predicted to be lower (for example, in the case in which there are no walls, obstacles, or traffic in the signal transmission path), the number of virtually formed vertical and horizontal grid lines decreases and the spacing therebetween becomes wider. As another embodiment, based on a positioning time, as the variability is predicted to be higher (for example, when there is a high floating population such as daytime, business hours), the number virtually formed vertical and horizontal grid lines increases and the spacing therebetween becomes narrower, and as the variability is predicted to be lower (for example, when there is a low floating population such as nighttime/dawn, closed hours), the number of virtually formed vertical and horizontal grid lines decreases and the spacing therebetween becomes wider.

In this way, when the vertical/horizontal grid lines are virtually formed differently for each situation, a fingerprint profile and a variability fingerprint profile for each virtual partition feature may be established and built in a database. In other words, even for the same indoor space, vertical/horizontal grid lines can be virtually formed differently depending on the features of the indoor space, whether it is a public space, floating population, positioning time, structural features, etc., and different fingerprint profiles and variability fingerprint profiles may be established for each virtually partitioning method and built in each corresponding database. This will be described with reference to FIG. 5

FIG. 5 is an exemplary diagram illustrating variability fingerprint profiles for each positioning time according to an embodiment of the present invention.

As illustrated in FIG. 5, even in the same indoor space, virtual partitioning may be performed in different ways for each positioning time, and different fingerprint profiles (not shown) and variability fingerprint profiles according to each virtual partitioning method may be established and stored in each database.

Accordingly, the first location determining unit may determine a first location (or initial location) using a first fingerprint profile (not shown) already established in correspondence with an indoor space 510 to which a first virtual partitioning method is applied at a first positioning time. Similarly, the second location determining unit may determine a second location (or final location) using the first variability fingerprint profile 520 already established in correspondence with the indoor space 510 to which the first virtual partitioning method is applied at the first positioning time. In addition, the first location determining unit may determine the first location (or initial location) using a second fingerprint profile (not shown) already established in correspondence with an indoor space 530 to which a second virtual partitioning method is applied at a second positioning time. Similarly, the second location determining unit may determine the second location (or final location) using the second variability fingerprint profile 540 already established in correspondence with the indoor space 530 to which the first virtual partitioning method is applied at the second positioning time.

Embodiments according to the present invention may be implemented by various means, for example, hardware, firmware, software, or a combination thereof. In the case of implementation by hardware, one embodiment of the present invention may be implemented by at least one among application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In addition, in the case of implementation by firmware or software, one embodiment of the present invention is implemented in the form of a module, procedure, function, etc. that performs the functions or operations described above, and is stored in a recording medium readable through various computer means. Here, the recording medium may include program commands, data files, data structures, etc. alone or in combination. Program instructions recorded on the recording medium may be those specially designed and configured for the present invention or those known and usable to those skilled in computer software. For example, the recording media may include magnetic media such as hard disks, floppy disks and magnetic tapes, optical media such as a compact disc read only memories (CD-ROM), a digital video disc (DVD), magneto-optical media, such as floptical disks, and hardware devices specially configured to store and execute program instructions, such as a ROM, RAM, flash memory, and the like. Examples of the program instructions may include high-level language code that can be executed by a computer using an interpreter, as well as machine language code such as that produced by a compiler. These hardware devices may be configured to serve as at least one software module to perform the operations of the present invention, and vice versa.

In addition, a device or terminal according to the present invention may be driven by instructions that enable at least one processor to perform the functions and processes described above. For example, such instructions may include interpreted instructions, such as script instructions including JavaScript or ECMAScript instructions, executable code, or other instructions stored in a computer-readable medium. Furthermore, the device according to the present invention may be implemented in a distributed manner over a network, such as a server farm, or may be implemented in a single computer device.

In addition, the computer program (also known as a program, software, a software application, script, or code) loaded in the device according to the present invention and executing the method according to the present invention may be written in any form of programming language including compiled or interpreted language or a priori or procedural language, and may be configured in any form, including stand-alone programs or modules, components, subroutines, or other units suitable for use in a computer environment. Computer programs do not necessarily correspond to files in a file system. A program may be stored in a single file provided to the requested program, or in multiple interacting files (e.g., a file that stores one or more modules, subprograms, or parts of code), or in part of a file (e.g., one or more scripts stored within a markup language document) that includes other programs or data. A computer program may be configured to be executed on a single computer or on multiple computers located at one site or distributed across multiple sites and interconnected by a communication network.

For convenience of description, the drawings are divided and described, but it is also possible to design a new embodiment by merging the embodiments described in each drawing. In addition, the present invention is not limited to the configuration and method of the embodiments as described above, and the above-described embodiments may be configured by selectively combining all or part of each embodiment so that various modifications can be made.

In addition, while the above has been shown and described with respect to exemplary embodiments of the present specification, the present specification is not limited to the specific embodiments described above. Of course, various modifications can be made by those skilled in the art to which the invention belongs without departing from the spirit of the invention claimed in the claims, and these modifications should not be individually understood from the technical spirit or the perspective of the present invention.

The invention claimed is:

1. An indoor wireless positioning method comprises:
receiving initial received signal strength indicator (RSSI) information from a reception unit;
searching for a fingerprint matching measured initial RSSI information in a fingerprint database;
determining a first location corresponding to the retrieved fingerprint to be an initial location of the reception unit;
receiving additional RSSI information from the reception unit;
extracting features of variability between the additional RSSI information and the initial RSSI information;
searching for variability fingerprints matching the initial location and extracted RSSI variability features in a variability fingerprint database; and
updating a second location to a current location of the reception unit when the second location corresponding to the retrieved variability fingerprint is different from the initial location,
wherein the second location is a location in a candidate area within a preset distance range centered on the first location.

2. The method according to claim 1, further comprising generating the fingerprint database,
wherein the generating of the fingerprint database includes:
virtually forming a plurality of vertical and horizontal grid lines on an indoor space;
obtaining RSSIs, which are transmitted from a plurality of access points (APs) disposed at different locations, for each intersection of the vertical and horizontal grid lines; and
constructing the fingerprint database by linking location information of each intersection with the RSSI obtained for each intersection.

3. The method according to claim 2, further comprising generating a variability fingerprint database,
wherein the generating of the variability fingerprint database includes:
collecting the RSSI transmitted from the plurality of APs for a predetermined period for each location at the intersection of the vertical and horizontal grid lines;
extracting variability features of the collected RSSIs for each intersection using a machine learning-based feature extraction algorithm; and
constructing the variability fingerprint database by linking the location information of each intersection and variability features extracted for each intersection.

4. The method according to claim 3, wherein the searching for the variability fingerprints in the variability fingerprint database includes:
extracting candidate variability fingerprints corresponding to the intersections included in a preset distance range from the initial location; and
searching for variability features that match the RSSI variability features among the candidate variability features.

5. The method according to claim 3, wherein the variability features are extracted based on at least one category among a maximum variation value, a minimum variation value, a variation range, and a variation speed of the RSSI information collected for each intersection.

6. The method according to claim 3, further comprising constructing a variability feature classification model through machine learning the variability features extracted for each intersection,
wherein the extracting of the variability features is to classify the variability features between the initial RSSI information and the additional RSSI information after inputting the initial RSSI information and the additional RSSI information to the variability feature classification model.

7. The method according to claim 3, wherein the plurality of vertical and horizontal grid lines are virtually formed in a dynamic manner based on at least one among floating population of the indoor space, structural features, and positioning time.

8. The method according to claim 3, wherein:
as an average floating population of the indoor space increases, the number of virtually formed vertical and horizontal grid lines increases and the spacing therebetween becomes narrower; and
as the average floating population of the indoor space decreases, the number of the plurality of virtually formed vertical and horizontal grid lines decreases and the spacing therebetween becomes wider.

9. The method according to claim 3, wherein, based on structural features:
as the variability of the indoor space is predicted to be higher, the number of virtually formed vertical and horizontal grid lines increases and the spacing therebetween becomes narrower; and
as the variability of the indoor space is predicted to be lower, the number of virtually formed vertical and horizontal grid lines decreases and the spacing therebetween becomes wider.

10. The method according to claim 3, wherein, based on a positioning time:
as the variability is predicted to be higher, the number of virtually formed vertical and horizontal grid lines increases and the spacing therebetween becomes narrower; and as the variability is predicted to be lower, the number of virtually formed vertical and horizontal grid lines decreases and the spacing therebetween becomes wider.

11. The method according to claim 1, further comprising maintaining the initial location as the current location of the reception unit and recognizing the additional RSSI information as the initial RSSI information when the second location stored in correspondence with the retrieved variability fingerprint and the initial location are the same.

\* \* \* \* \*